(No Model.)
J. HOLEKAMP.
Seed Planter.
No. 242,927.  Patented June 14, 1881.
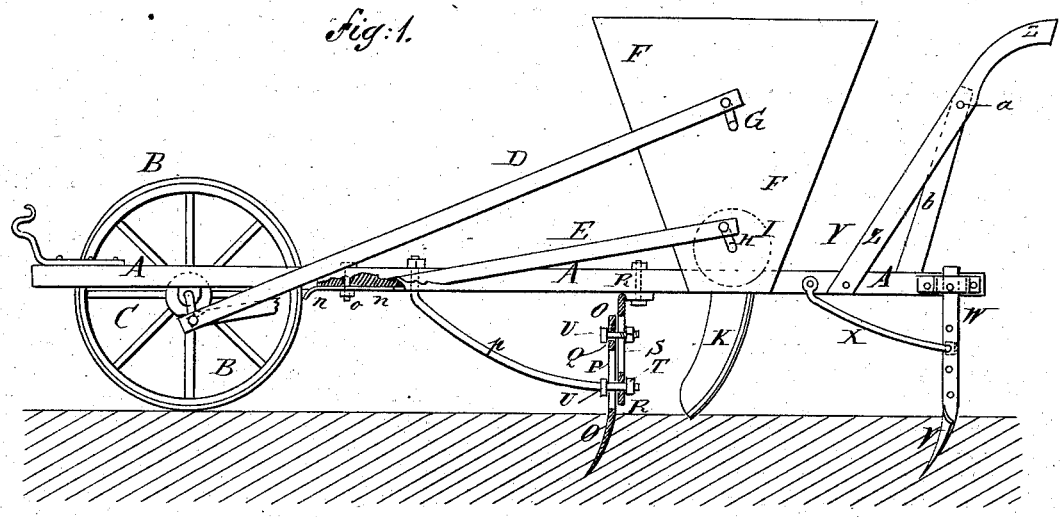
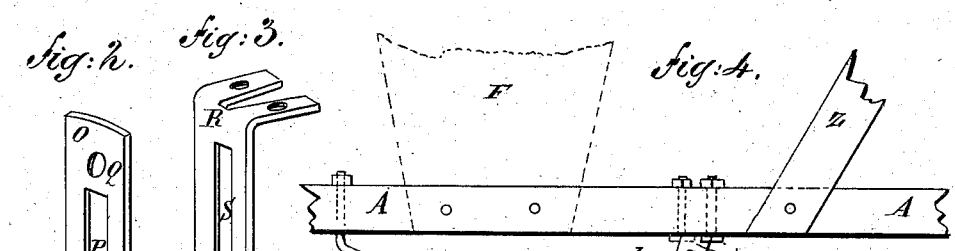
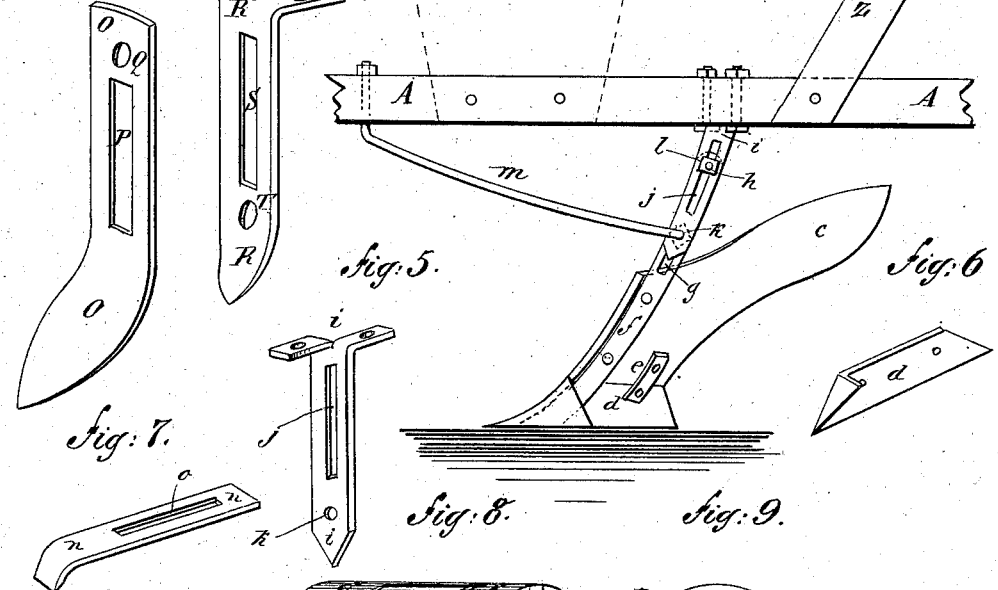
WITNESSES:
Chas Nida
C. Sedgwick
INVENTOR:
J. Holekamp
BY Munn & Co
ATTORNEYS.
N. PETERS, Photo-Lithographer, Washington, D. C.

UNITED STATES PATENT OFFICE.

JULIUS HOLEKAMP, OF COMFORT, TEXAS.

SEED-PLANTER.

SPECIFICATION forming part of Letters Patent No. 242,927, dated June 14, 1881.

Application filed April 11, 1881. (No model.)

*To all whom it may concern:*

Be it known that I, JULIUS HOLEKAMP, of Comfort, in the county of Kendall and State of Texas, have invented a new and useful Improvement in Seed-Planters, of which the following is a specification.

Figure 1 is a side elevation, partly in section, of my improvement. Fig. 2 is a perspective view of the furrow-opening plow. Fig. 3 is a perspective view of the standard of the furrow-opening plow. Fig. 4 is a side view, partly in section, of another form of covering-plow. Fig. 5 is a perspective view of the standard of the plow shown in Fig. 4. Fig. 6 is a perspective view of the point of the plow shown in Fig. 4. Fig. 7 is a perspective view of the wheel-scraper. Fig. 8 is a perspective view of the seed-dropping cylinder. Fig. 9 is an end elevation, partly in section, of the same.

Similar letters of reference indicate corresponding parts.

The object of this invention is to improve the construction of the seed-planters for which Letters Patent No. 236,223 were issued to me January 4, 1881, in such a manner as to make them simpler in construction and more convenient and effective in use.

In the accompanying drawings, A represents the frame of the planter, the forward end of which is slotted to receive the wheel B. The journals of the wheel B revolve in bearings attached to the frame A, and to the ends of the said journals are attached, or upon them are formed, cranks C, to which are pivoted the forward ends of the connecting-bars D E. The connecting-bars D E extend back to the seed-box F, which is attached to the frame A at a little distance from its rear end. The rear end of the connecting-bar D is pivoted to the crank G, formed upon or attached to the journal of the stirrer-shaft, which works in the upper part of the seed-box F. The rear end of the connecting-bar E is pivoted to the crank H, formed upon or attached to the journal of the seed-dropping cylinder I, which works in the lower part of the seed-box F.

Around the middle part of the cylinder I is formed a row of grooves or recesses, J, to receive cotton-seeds and drop them into the spout K, through which they pass to the ground. The recesses J are designed to be covered when the machine is to be used for planting seeds other than cotton-seeds.

In the end parts of the cylinder I are formed rows of holes L M, to receive seed and drop it into the spout K. The holes L at one end of the cylinder I are made larger than the holes M at the other end of the said cylinder, to adapt the said holes to be used for planting larger and smaller seed. The holes in each row are made close together, and into the said cylinder, at the bottom of each hole L M, is screwed a screw, N. The heads of the screws N are made of the same size as the holes into which they pass. With this construction, by adjusting the screws N, the said holes can be made to contain less or more seed, as may be desired. With this construction, by turning some of the screws N out until their heads are flush with the surface of the cylinder I, the seed can be planted at any desired distance apart, care being taken that the holes left open shall be at equal distances apart. The furrow is opened to receive the seed by the plow O, the shank of which has a longitudinal slot, P, formed through it, and a hole, Q, in its upper end, above the upper end of the said slot P. The shank of the plow O rests against a hanger, R, which has a longitudinal slot, S, formed through it, and a hole, T, in its lower end, below the lower end of the slot S. The shank of the plow O is secured to the hanger R by the bolt U, passing through the hole Q and the slot S, and the rear end of the brace-rod *p*, passing through the slot P and the hole T, and having two nuts screwed upon it, one upon each side of the said shank and hanger, so that the said plow O can be adjusted higher or lower by loosening the nuts of the said bolt and brace. The forward end of the brace-rod *p* is bent upward, passed through the frame A, and has a nut screwed upon it. The upper end of the hanger R is bent back at right angles, and is secured to the frame A by bolts.

The furrow opened by the plow O is filled, and the seed is covered by plows V, the standards W of which are secured adjustably to the side parts of the frame A. The standards W have holes formed through them to receive the rods X, the rear ends of which are bent to one side at right angles to pass through the said holes in standards W, and have nuts screwed upon their rear ends to keep them in place. The rods X have eyes in their forward ends to receive a rod, Y, which passes crosswise through the frame A, and has nuts screwed upon its ends. With this construction, as the standards W are moved up and down, the ends of the rods Y are moved from one to another of the holes in the said standards, to keep the said rods at the proper inclination.

Z are the handles, the lower ends of which are secured to the frame A at a little distance from its rear end. The upper parts of the handles Z are attached to the ends of the round a, which is attached at its center to the upper end of the standard b. The lower end of the standard b is attached to the rear end of the frame A.

When the machine is used for broadcast-sowing the seed is covered or plowed in by the plow shown in Fig. 4. In this case the mold-board c is made long to spread the furrow-slice well over the ground, and the point or share d has its landside end bent downward to serve as a partial landside, as shown in Figs. 4 and 6. The outer parts of the adjacent edges of the mold-board c and point d are connected by a small plate, e, bolted to them, and the inner parts of the said mold-board and point are bolted to the upright f.

In the upright f, above the mold-board c, is formed a longitudinal slot, g, and in its upper end is formed a hole, h. The upright f is attached to the hanger i, the upper end of which has a slit formed in it, forming two tongues, the said tongues being bent down in opposite directions and bolted to the said frame.

In the hanger i is formed a slot, j, and in its lower end a hole, k. The upright f is secured to the hanger i by the bolt l, passing through the hole h and slot j, and by the end of the brace-rod m, which has nuts screwed upon its said end, upon the opposite sides of the upright f and hanger i, so that the plow can be adjusted to run deeper or shallower in the ground by loosening the nuts of the bolt l and brace m. The forward end of the brace-rod m is bent upward, passes through the frame A, and has a nut screwed upon its said end.

To the forward part of the frame A, in the rear of the wheel B, is secured a plate, n, by a bolt, o, to scrape off any mud that may adhere to the rim of the said wheel B. The scraper n has a longitudinal slot formed through it to receive the fastening-bolt o, so that the said scraper can be moved forward as it wears. The forward end of the scraper n is bent downward to bring it into a good working position. The bolt-holes through the tongues upon the upper end of the hanger i are elongated, so that the plow can be turned to take and leave land by loosening the fastening-bolts, and will be securely locked in place by tightening the said bolts.

Having thus fully described my invention, I claim as new and desire to secure by Letters Patent—

In a seed-planter, the seed-dropping cylinder I, constructed substantially as herein shown and described, with a row of recesses, J, around its middle part, and rows of different-sized recesses L M, provided with adjustable gage-screws N around its end parts, whereby different-sized seeds can be dropped by the same cylinder, as set forth.

JULIUS HOLEKAMP.

Witnesses:
AUG. SALTIN,
HENRY SCHMELTER.